United States Patent
Masaki et al.

(10) Patent No.: US 9,695,486 B2
(45) Date of Patent: Jul. 4, 2017

(54) CR-CONTAINING AUSTENITIC ALLOY AND METHOD FOR PRODUCING THE SAME

(71) Applicant: NIPPON STEEL & SUMITOMO METAL CORPORATION, Tokyo (JP)

(72) Inventors: Yasuhiro Masaki, Tokyo (JP); Manabu Kanzaki, Tokyo (JP); Yasuyoshi Hidaka, Tokyo (JP); Akihiro Uehira, Tokyo (JP); Osamu Miyahara, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 66 days.

(21) Appl. No.: 14/388,283

(22) PCT Filed: Feb. 27, 2013

(86) PCT No.: PCT/JP2013/055087
§ 371 (c)(1),
(2) Date: Sep. 26, 2014

(87) PCT Pub. No.: WO2013/146034
PCT Pub. Date: Oct. 3, 2013

(65) Prior Publication Data
US 2015/0322560 A1 Nov. 12, 2015

(30) Foreign Application Priority Data
Mar. 28, 2012 (JP) ................. 2012-074539

(51) Int. Cl.
| C23C 8/16 | (2006.01) |
| C22C 19/05 | (2006.01) |
| G21D 1/00 | (2006.01) |
| C21D 1/10 | (2006.01) |
| C21D 1/76 | (2006.01) |
| C23C 8/18 | (2006.01) |
| C22C 38/50 | (2006.01) |
| C22F 1/00 | (2006.01) |
| C22C 30/00 | (2006.01) |
| C22C 38/00 | (2006.01) |
| C22C 38/02 | (2006.01) |
| C22C 38/04 | (2006.01) |
| C22C 38/06 | (2006.01) |
| C22C 38/40 | (2006.01) |
| C22C 38/42 | (2006.01) |
| C22F 1/08 | (2006.01) |

(52) U.S. Cl.
CPC .............. *C21D 1/10* (2013.01); *C21D 1/76* (2013.01); *C22C 19/05* (2013.01); *C22C 19/058* (2013.01); *C22C 30/00* (2013.01); *C22C 38/001* (2013.01); *C22C 38/02* (2013.01); *C22C 38/04* (2013.01); *C22C 38/06* (2013.01); *C22C 38/40* (2013.01); *C22C 38/42* (2013.01); *C22C 38/50* (2013.01); *C22F 1/00* (2013.01); *C22F 1/08* (2013.01); *C23C 8/16* (2013.01); *C23C 8/18* (2013.01); *G21D 1/006* (2013.01); *C21D 2211/001* (2013.01); *G21D 1/00* (2013.01); *Y02E 30/40* (2013.01); *Y02P 10/253* (2015.11); *Y10T 428/26* (2015.01); *Y10T 428/265* (2015.01)

(58) Field of Classification Search
None
See application file for complete search history.

(56) References Cited

U.S. PATENT DOCUMENTS

| 6,612,898 | B1 | 9/2003 | Ohmi et al. | |
| 9,255,319 | B2* | 2/2016 | Masaki | C22C 19/05 |
| 2002/0155306 | A1* | 10/2002 | Anada | C23C 8/10 |
| | | | | 428/472.1 |
| 2003/0116229 | A1 | 6/2003 | King et al. | |
| 2009/0123775 | A1* | 5/2009 | Kanzaki | C22C 19/05 |
| | | | | 428/586 |
| 2015/0064454 | A1* | 3/2015 | Kanzaki | C23C 8/14 |
| | | | | 428/336 |

FOREIGN PATENT DOCUMENTS

| CA | 2 371 312 | 9/2001 |
| CA | 2 657 782 | 1/2008 |
| CA | 2 807 525 | 3/2012 |
| EP | 1 016 734 | 7/2000 |
| JP | 61-186467 | 8/1986 |
| JP | 64-055366 | 3/1989 |
| JP | 07-197207 | 8/1995 |
| JP | 08-029571 | 2/1996 |
| JP | 08-060307 | 3/1996 |
| JP | 2002-121630 | 4/2002 |
| JP | 2002-322553 | 11/2002 |
| JP | 2002-348655 | 12/2002 |
| JP | 3596234 | 9/2004 |
| JP | 2007-284704 | 11/2007 |
| WO | 2012/026344 | 3/2012 |

OTHER PUBLICATIONS

JP 07_197207A_MT 1995, 08-01.*
JP08_060307A_MT 1996, 03-05.*

* cited by examiner

*Primary Examiner* — Vera Katz
(74) *Attorney, Agent, or Firm* — Clark & Brody

(57) ABSTRACT

There is provided a Cr-containing austenitic alloy having a chromium oxide film with a thickness of 5 nm or larger on the surface, wherein the content of Mn in a base metal is, by mass percent, less than 0.1%. The chemical composition of the base metal desirably consists of, by mass percent, C: 0.15% or less, Si: 1.00% or less, Mn: less than 0.1%, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

10 Claims, No Drawings

CR-CONTAINING AUSTENITIC ALLOY AND METHOD FOR PRODUCING THE SAME

TECHNICAL FIELD

The present invention relates to a Cr-containing austenitic alloy, in which Ni is eluted little even if the alloy is used in a high-temperature water environment for a long period of time, and a method for producing the Cr-containing austenitic alloy. More particularly, the present invention relates to a Cr-containing austenitic alloy, which is suitably used as a member for a nuclear plant and the like, and a method for producing the Cr-containing austenitic alloy.

BACKGROUND ART

A Cr-containing austenitic alloy has been used as various members because of being excellent in mechanical properties. In particular, since the members for a nuclear reactor is exposed to high-temperature water, a Cr-containing austenitic alloy excellent in corrosion resistance has been used as a member for a nuclear reactor. For example, as a member of a steam generator for a pressurized water reactor (PWR), a 60% Ni-30% Cr-10% Fe alloy or the like has been used.

These members are used in an environment of high-temperature water of about 300° C., which is a nuclear reactor water environment, for several years to several tens of years. For the Cr-containing austenitic alloy used as a steam generator tubing for nuclear plant, although Ni is contained much, and therefore the corrosion resistance is excellent and the corrosion rate is low, a minute amount of Ni is eluted from a base metal by the long-term use.

In a process in which reactor water circulates, the released Ni is carried to a reactor core portion and receives neutron irradiation in the vicinity of fuel. When receiving neutron irradiation, Ni is converted into radiocobalt by nuclear reaction. This radiocobalt continues to emit radioactive rays for a long period of time because the half-life thereof is very long. Therefore, if the amount of released Ni is large, regular inspection cannot be started until the radiation dose emitted decreases to a proper value, so that the period of regular inspection extends, which results in an economic loss.

To reduce the amount of released Ni is a very important issue in using a light water reactor for a long period of time. So far, therefore, by improving the corrosion resistance on the material side and by controlling the quality of reactor water, measures have been taken to suppress the elution of Ni from the Cr-containing austenitic alloy.

Patent Document 1 discloses a method in which Ni-based alloy heat-transfer pipe is annealed in the temperature range of 400 to 750° C. in an atmosphere having a degree of vacuum of $10^{-2}$ to $10^{-4}$ Torr to form an oxide film consisting mainly of chromium oxides, whereby the general corrosion resistance is improved.

Patent Document 2 discloses a method for producing a member for nuclear plant, in which after the solution treatment of a Ni-based precipitation strengthened alloy, heating treatment is performed as at least part of age hardening treatment and oxide film forming treatment in an oxidizing atmosphere of $10^{-3}$ Torr to atmospheric pressure.

Patent Document 3 discloses a method for producing a Ni-based alloy product, in which a Ni-based alloy product is heat-treated in an atmosphere of hydrogen or a mixed atmosphere of hydrogen and argon, the atmosphere having a dew point of −60° C. to +20° C.

Patent Document 4 discloses a method for forming a chromium-rich layer by exposing an alloy workpiece containing nickel and chromium to a gas mixture of water vapor and at least one kind of non-oxidizing gases.

Patent Documents 5 and 6 disclose a method for producing a Cr-containing nickel-based alloy pipe, in which the Cr-containing nickel-based alloy pipe is treated in an atmosphere consisting of non-oxidizing gas containing oxidizing gas, whereby a chromium oxide film having a predetermined thickness is formed on the inner surface of pipe.

LIST OF PRIOR ART DOCUMENTS

Patent Document

Patent Document 1: JP64-55366A
Patent Document 2: JP8-29571A
Patent Document 3: JP2002-121630A
Patent Document 4: JP2002-322553A
Patent Document 5: WO2012/026344
Patent Document 6: JP2007-284704A

DISCLOSURE OF THE INVENTION

Problems to be Solved by the Invention

The film formed by the method described in Patent Document 1 is formed by oxidation using oxygen having a high oxidation potential. Therefore, as described later, large amounts of oxides containing Mn are formed in the film, and therefore a sufficient elution preventing effect is not achieved. The method described in Patent Document 2 has a problem that oxidized Ni is easily incorporated into a film, and this Ni is eluted during the use.

As the oxidizing gas for oxidizing a pipe, water vapor, oxygen, and the like can be mentioned; however, it is thought that water vapor is most suitable from the viewpoint of safety, cost, and the like. In the methods described in Patent Documents 3 to 5, a relatively high elution preventing effect can be achieved by forming a film by using water vapor. However, because a thick film is formed, cracking, peeling, and the like of film may occur.

In Patent Document 6, carbon dioxide is used as an oxidizing gas to form a chromium oxide film on a Ni-based alloy. However, carbon dioxide generates harmful carbon monoxide after the oxidation of metal. Also, in some cases, the Ni-based alloy is carburized by the produced carbon monoxide depending on the condition. Therefore, it cannot be said that these methods provide safe and high-quality products.

In a product of Cr-containing austenitic alloy having a chromium oxide film, if the film is thick, problems of cracking, peeling, and the like may occur, and also the appearance is impaired. Therefore, the film thickness is preferably as small as possible. However, a thin film generally shows a tendency for corrosion resistance to decrease.

The present inventors studied a method in which, concerning a Cr-containing austenitic alloy having a chromium oxide film, the metal elution preventing effect is enhanced while the thickness of film is further decreased, and came to obtain the findings described below.

If a Cr-containing austenitic alloy containing Mn is heat-treated, since Mn diffuses easily, Mn diffuses in the outer layer. Since Mn is an element that is more liable to be oxidized than Cr, Mn comes to be present as oxide particles such as $MnCr_2O_4$ in the chromium oxide film.

It was found that, when an alloy formed with a chromium oxide film is exposed to high-temperature water, the amount of released Ni from substrate (austenitic alloy) increases with the increase in the amount of oxide particles containing Mn that is present in the film. The cause for this is thought to be that the path of metal ions is formed on the interface of oxide particles containing Mn, and the amount of metal ions in the alloy base metal eluted in the solution is accelerated.

If the amount of Mn contained in the Cr-containing austenitic alloy base metal is restrained, the amount of Mn diffusing in the film during heat treatment is decreased, and thereby a chromium oxide film having a higher purity is formed. Therefore, even a thin film achieves a high elution preventing effect.

Means for Solving the Problems

The present invention was completed on the basis of the above findings, and involves the Cr-containing austenitic alloys described in the following items (1) to (6), and the methods for producing the Cr-containing austenitic alloys described in the following items (7) and (8).

(1) A Cr-containing austenitic alloy having a chromium oxide film with a thickness of 5 nm or larger on the surface, wherein the content of Mn in a base metal is, by mass percent, less than 0.1%.

(2) The Cr-containing austenitic alloy according to (1), wherein the chemical composition of the base metal consists of, by mass percent, C: 0.15% or less, Si: 1.00% or less, Mn: less than 0.1%, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

(3) The Cr-containing austenitic alloy according to (1) or (2), wherein the thickness of the chromium oxide film is smaller than 180 nm.

(4) The Cr-containing austenitic alloy according to any one of (1) to (3), wherein the thickness of the chromium oxide film is 50 nm or smaller.

(5) The Cr-containing austenitic alloy according to any one of (1) to (4), wherein the Mn/Cr ratio in the surface layer of the chromium oxide film is, by atom ratio, 0.00001 or higher and lower than 0.05.

(6) The Cr-containing austenitic alloy according to any one of (1) to (5), wherein the Cr-containing austenitic alloy is used as a member for a nuclear plant.

(7) A method for producing the Cr-containing austenitic alloy according to any one of (1) to (6), wherein the surface of the Cr-containing austenitic alloy, in which the content of Mn in the base metal is, by mass percent, less than 0.1%, is heated to the temperature range of 600 to 1200° C. in a gaseous mixture atmosphere in which water vapor is contained in a non-oxidizing gas, and thereby a chromium oxide film is formed on the surface of the Cr-containing austenitic alloy.

(8) The method for producing a Cr-containing austenitic alloy according to (7), wherein the water vapor concentration is 1000 ppm or less.

The "chromium oxide film" means an oxide film consisting mainly of $Cr_2O_3$, and may contain oxides other than $Cr_2O_3$, such as $MnCr_2O_4$, $TiO_2$, $Al_2O_3$, and $SiO_2$. Also, if an oxide film consisting of chromium oxides is provided on the surface of the Cr-containing austenitic alloy, any other oxide layer may be formed on the upper layer (outside layer) and/or the lower layer (inside layer) of the chromium oxide layer.

Advantageous Effects of the Invention

According to the present invention, a chromium oxide film can be formed on the surface of the Cr-containing austenitic alloy at a low cost and uniformly. The Cr-containing austenitic alloy produced by the method according to the present invention can be used suitably as a member that is used in high-temperature water, such as a steam generator tubing, especially as a member for nuclear plant because Ni is eluted very little even if the Cr-containing austenitic alloy is used in a high-temperature water environment, for example, in a high-temperature water environment in a nuclear power generation plant for a long period of time.

MODE FOR CARRYING OUT THE INVENTION

1. Chemical Composition

The content of Mn contained in the base metal of the Cr-containing austenitic alloy according to the present invention has to be, by mass percent, less than 0.1%.

Mn: less than 0.1%

By suppressing the content of Mn (manganese), the amount of Mn in the film is reduced, whereby a high elution preventing effect can be achieved. Therefore, the content of Mn has to be less than 0.1%. Manganese is mixed in the base metal from raw materials, and by selecting a raw material containing little Mn, the content of Mn in the alloy base metal can be made less than 0.1%. The Mn content is preferably 0.05% or less. Also, the lower limit of the Mn content is not subject to any special restriction because the Mn content should be as low as possible. However, in order to make the Mn content less than 0.0001%, an independent process for removing Mn contained unavoidably is required, which is unfavorable in terms of cost. Therefore, the Mn content is preferably 0.0001% or more, further preferably 0.001% or more.

Also, the chemical composition of the base metal preferably consists of, by mass percent, C: 0.15% or less, Si: 1.00% or less, Mn: less than 0.1%, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

The "impurities" are herein elements that are mixed in by various factors in the production process including raw materials such as ore or scrap when an alloy is produced on an industrial scale, and are allowed to be contained within the range such that the elements do not exert an adverse influence on the present invention.

The reason why the content of each element is restricted is explained below. In the explanation below, the symbol "%" of the content of each element means "mass percent".

C: 0.15% or less

C (carbon) may be contained because of having an effect of enhancing the grain boundary strength of alloy. However, if more than 0.15% of C is contained, the stress corrosion cracking resistance may be deteriorated. If C is contained, the content thereof is preferably 0.15% or less. The C content is further preferably 0.06% or less. In order to achieve the above-described effect, the C content is preferably 0.01% or more.

Si: 1.00% or less

Si (silicon) is used as a deoxidizer at the time of smelting, and remains in the alloy as an impurity. If the content of Si is excessive, the cleanliness of alloy may decrease. Therefore, the content of Si is preferably 1.00% or less, further preferably 0.50% or less. The effect of Si as a deoxidizer is remarkable when the Si content is 0.05% or more.

P: 0.030% or less

P (phosphorus) is an element that is present in the alloy as an impurity. If the P content is more than 0.030%, the corrosion resistance may be adversely affected. Therefore, the P content is preferably 0.030% or less.

S: 0.030% or less

S (sulfur) is an element that is present in the alloy as an impurity. If the S content is more than 0.030%, the corrosion resistance may be adversely affected. Therefore, the S content is preferably 0.030% or less.

Cr: 10.0 to 40.0%

Cr (chromium) is an element necessary for producing an oxide film consisting of chromium oxides. In order to produce such an oxide film on the surface of alloy, it is desirable to contain 10.0% or more of Cr. However, if the Cr content is more than 40.0%, the workability may be deteriorated. Therefore, the Cr content is preferably 10.0 to 40.0%.

Ni: 8.0 to 80.0%

Ni (nickel) is an element necessary for ensuring the corrosion resistance of the austenitic alloy, and therefore 8.0% or more of Ni is preferably contained. On the other hand, since Ni is expensive, the minimum necessary amount of Ni has only to be contained depending on the intended use, and therefore the Ni content is preferably 80.0% or less. The Ni content is further preferably 45.0% or more.

Ti: 0.5% or less

Ti (titanium) is an element effective in improving the workability of alloy and suppressing the grain growth during welding. However, if the Ti content is more than 0.5%, the cleanliness of alloy may decrease. Therefore, the Ti content is preferably 0.5% or less, further preferably 0.4% or less. In order to achieve the above-described effects, the Ti content is preferably 0.1% or more.

Cu: 0.6% or less

Cu (copper) is an element that is present in the alloy as an impurity. If the Cu content is more than 0.6%, the corrosion resistance of alloy may decrease. Therefore, the Cu content is preferably 0.6% or less.

Al: 0.5% or less

Al (aluminum) is used as a deoxidizer at the time of steel making, and remains in the alloy as an impurity. The remaining Al turns to an oxide-base inclusion in the alloy, decreases the cleanliness of alloy, and may exert an adverse influence on the corrosion resistance and mechanical properties of alloy. Therefore, the Al content is preferably 0.5% or less.

N: 0.20% or less

N (nitrogen) need not be contained; however, in the Cr-containing austenitic alloy, which is an object of the present invention, about 0.01% of N is usually contained as an impurity. However, if N is contained positively, the strength can be enhanced without deterioration in the corrosion resistance. However, if more than 0.20% of N is contained, the corrosion resistance decreases. Therefore, the upper limit of the content of N, if contained, is 0.20%.

Two kinds of the Cr-containing austenitic alloys having the typical chemical compositions are as follows:

(a) A nickel-based alloy consisting of C: 0.15% or less, Si: 1.00% or less, Mn: less than 0.1%, P: 0.030% or less, S: 0.030% or less, Cr: 14.0 to 17.0%, Fe: 6.0 to 10.0%, Ti: 0.5% or less, Cu: 0.5% or less, and Al: 0.5% or less, the balance being Ni and impurities.

(b) A nickel-based alloy consisting of C: 0.06% or less, Si: 1.00% or less, Mn: less than 0.1%, P: 0.030% or less, S: 0.030% or less, Cr: 27.0 to 31.0%, Fe: 7.0 to 11.0%, Ti: 0.5% or less, Cu: 0.5% or less, and Al: 0.5% or less, the balance being Ni and impurities.

The alloy of the above item (a) is an alloy excellent in corrosion resistance in an environment containing chlorides because of containing 14.0 to 17.0% of Cr and 70 to 80% of Ni. In this alloy, the Fe content is preferably 6.0 to 10.0% from the viewpoint of the balance between the Ni content and the Cr content.

The alloy of the above item (b) is an alloy excellent in corrosion resistance not only in an environment containing chlorides but also in an environment of pure water and alkali at high temperatures because of containing 27.0 to 31.0% of Cr and 55 to 65% of Ni. In this alloy as well, the Fe content is preferably 7.0 to 11.0% from the viewpoint of the balance between the Ni content and the Cr content.

2. Oxide Film

In order to achieve a favorable Ni elution preventing effect, the thickness of oxide film has to be 5 nm or larger. The film thickness is preferably 10 nm or larger. On the other hand, considering the problems of cracking, peeling, and the like of film, a thin film is preferable, that is, the film thickness is preferably 1500 nm (1.5 μm) or smaller. This is because if the film thickness is 1500 nm or larger, the cracking of film is remarkable, and the elution of metal ions through the cracked portion is accelerated. Also, in the formation of chromium oxide film formed by the base metal oxidation in the heat treatment process, if the film thickness is excessively large, a deficiency in chromium in the base metal is liable to occur, and the possibility of grain boundary cracking increases.

For the Cr-containing austenitic alloy in the present invention, even if the chromium oxide film formed by heat treatment is thin, a sufficient Ni elution preventing effect can be achieved by suppressing the content of Mn in the base metal. Specifically, in order to achieve both of the reduction in film cracking and the elution preventing effect, the film thickness is preferably smaller than 180 nm, further preferably 170 nm or smaller. Also, if the film thickness is 50 nm or smaller, the possibility of film cracking, peeling, or deficiency in chromium in the base metal is low, and also the heat treatment itself can be performed in a mild condition. Therefore, the film thickness is further preferably 50 nm or smaller. The film thickness may be measured directly by using a scanning electron microscope (SEM) or a transmission electron microscope (TEM), or may be measured by depth direction analysis such as X-ray photoelectron spectroscopy (XPS), Auger electron spectroscopy (AES), or glow discharge optical emission spectroscopy (GDS).

The chromium oxide film formed on the surface of the Cr-containing austenitic alloy according to the present invention exhibits a more remarkable Ni elution preventing effect when having a given (oxide) composition. When the chromium oxide film is produced by oxidation of Cr-containing austenitic alloy, the film thickness changes according to the conditions of heat treatment, and likewise, the amount of Mn that diffuses in the outer layer of base metal and is produced as an oxide in the chromium oxide film also changes. A smaller amount of Mn in the film is preferable because, when the Mn/Cr ratio in the chromium oxide film is, by atom ratio, 0.00001 or higher and lower than 0.05, a higher Ni elution preventing effect can be achieved. The measurement of the Mn/Cr ratio is made in the surface layer of film, specifically, in the range to a depth from the film surface of 50 nm. The amounts of Cr and Mn in the oxide film in the range within 50 nm are measured by the depth direction analysis such as XPS, AES, or GDS, and thereby the Mn/Cr ratio is determined. In the case where the thickness of the chromium oxide film itself is smaller than 50 nm, the Mn/Cr ratio is determined in the entire depth of the film.

3. Producing Method

For the Cr-containing austenitic alloy according to the present invention, a base metal having the defined Mn content is heat-treated in the gaseous mixture atmosphere in which a certain amount of water vapor is contained in a non-oxidizing gas as an oxidizer, whereby a chromium oxide film is formed.

<Atmospheric Gas>

If being contained even in a minute amount, water vapor forms the chromium oxide film. Therefore, the lower limit of the water vapor concentration is not defined especially. However, if 5 ppm or more of water vapor is contained, the effect thereof becomes remarkable. If the water vapor concentration exceeds 15,000 ppm, the film becomes too thick, and also the excessive water vapor concentration is uneconomical. Therefore, the water vapor concentration is preferably 15,000 ppm or lower, further preferably 10,000 ppm or lower, and still further preferably 1000 ppm or lower. If the water vapor concentration is 1000 ppm or lower, under a proper heat treatment temperature condition of the temperature range of 600 to 1200° C., the film thickness is easily made smaller than 180 nm, and the Ni elution preventing effect brought about by the decrease in Mn amount is easily achieved.

Further, in the present invention, as the oxidizer, oxygen may be added in addition to water vapor, or oxygen may be used alone. Like water vapor, oxygen can form the chromium oxides. When oxygen gas is used, the content of oxygen gas is preferably 10,000 ppm or less. This is because, if oxygen is contained in a large amount, the formation of chromium oxide film is accelerated, and the Cr concentration in the base metal is decreased, so that the corrosion resistance is deteriorated. If being contained even in a minute amount, oxygen achieves the above-described effect. Therefore, the lower limit thereof is not defined especially; however, the effect thereof becomes remarkable when 1 ppm or more of oxygen is contained.

As the non-oxidizing gas, for example, hydrogen gas, rare gases (Ar, He, etc.), carbon monoxide gas, nitrogen gas, hydrocarbon gas, and the like are cited. When carbon monoxide gas, nitrogen gas, or hydrocarbon gas of these non-oxidizing gases is used, there is a fear of carburizing and nitriding. Therefore, one or more kinds of gases selected from hydrogen gas and rare gases are preferably contained.

Hydrogen gas is often used as an atmospheric gas for heat treatment on an industrial scale. If this gas is used for dilution of water vapor gas, the production cost can be reduced. Therefore, it is most favorable that heat treatment is performed with the atmospheric gas being a gas atmosphere consisting of water vapor gas and hydrogen gas.

When hydrogen gas is used at least partially, by feeding oxygen as an oxidizing gas, hydrogen and oxygen are caused to react with each other to produce water, and water may be used for oxidation. In this case, attention has to be paid to explosion.

The concentration of atmospheric gas in the case where water vapor is contained can be controlled by regulating the water vapor concentration by dew point control. Also, after the dew point has been regulated by using the non-oxidizing gas, water vapor gas or further oxygen gas may be added.

<Flow Rate of Supplied Atmospheric Gas>

In the case where the alloy on which a chromium oxide film is formed is a tube, the atmospheric gas supplied onto the inner surface of tube has only to be in contact with the tube inner surface, but the flowing of atmospheric gas at a fixed flow rate is preferable because a film is formed uniformly on the tube inner surface. The flow rate is preferably 1.0 to 50 L/min. This is because, if the flow rate is lower than 1.0 L/min, for the purpose of forming the film uniformly in the whole of long tube length, it is difficult to regulate the water vapor concentration, the heating conditions, and the like. On the other hand, if the flow rate is higher than 50 L/min, the oxide film becomes excessively thick.

<Heat Treatment Temperature and Heat Treatment Time>

The heat treatment temperature may be in such a range that the proper thickness and composition of chromium oxide film and the strength characteristics of alloy can be attained. The heat treatment temperature is preferably in the temperature range of 600 to 1200° C.

When the heating temperature is lower than 600° C., the oxidation of chromium may be insufficient. In order that a film having a proper thickness be obtained in a proper time period, the heating temperature is preferably 600° C. or higher. The heating temperature is further preferably 700° C. or higher. On the other hand, if the heating temperature exceeds 1200° C., the strength of the Cr-containing austenitic alloy could not be ensured. Therefore, the heating temperature is preferably 1200° C. or lower.

The heating time may be set in such a range that proper thickness and composition of oxide film can be attained. That is, in order to form an oxide film consisting mainly of chromium oxides, it is desirable to heat the pipe for one minute or longer. The upper limit of heating time is not defined especially. However, at least in the preferable temperature range of 600 to 1200° C. of the present invention, even if the pipe is heated for a time period exceeding 24 hours, an oxide film scarcely grows, and such heating time is disadvantageous in terms of production cost as well. Therefore, the heating time should be in the range of one minute to 24 hours.

<Method for Producing Material for Cr-Containing Austenitic Alloy>

The Cr-containing austenitic alloy, which is an object of the present invention, can be used in various shapes. After a raw material having a predetermined chemical composition has been melted to produce an ingot, a Cr-containing austenitic alloy is usually produced through the steps of hot working and annealing or the steps of hot working, cold working, and annealing. Further, to improve the corrosion resistance of base metal, a special heat treatment called thermal treatment is sometimes performed.

The heat treatment of the present invention may be performed after the annealing treatment, or the annealing treatment may be performed as the heat treatment of the present invention. If the annealing treatment may be performed as the heat treatment, a heat treatment step for forming the oxide film need not be added to the conventional production process, so that the production cost does not increase. Also, in the case where thermal treatment is performed after annealing as described above, the thermal treatment may be performed as the heat treatment for forming the oxide film. Further, both of annealing treatment and thermal treatment may be performed as a treatment for forming the oxide film.

Hereunder, the present invention is explained more specifically with reference to examples; however, the present invention is not limited to these examples.

EXAMPLE 1

(1) Formation of Oxide Film on Cr-Containing Austenitic Alloy

A starting material used for an experiment was produced by the producing method described below. First, alloys having the chemical compositions given in Table 1 were melted in a vacuum to obtain ingots. Each of these ingots was turned into a plate material by the process described below. First, an ingot was hot-forged, and thereafter being heated to 1250° C., and was rolled to a thickness of 10 mm Subsequently, the rolled plate material was heat-treated at 1100° C. in the atmospheric air, and an oxide film on the surface was removed mechanically. Thereafter, the treated plate material was further cold-rolled into a sheet material having a thickness of 2.5 mm

TABLE 1

| | Chemical composition (in mass %, balance: Fe and impurities) | | | | | | | | | |
|---|---|---|---|---|---|---|---|---|---|---|
| Alloy | C | Si | Mn | P | S | Cr | Ni | Ti | Cu | Al | N |
| A | 0.021 | 0.37 | 0.010 | 0.001 | <0.001 | 29.71 | 59.80 | 0.26 | 0.25 | 0.16 | 0.0042 |
| B | 0.020 | 0.36 | 0.095 | 0.001 | <0.001 | 29.74 | 59.62 | 0.26 | 0.24 | 0.16 | 0.0042 |
| C | 0.021 | 0.37 | 0.122* | 0.002 | <0.001 | 29.75 | 59.74 | 0.26 | 0.25 | 0.16 | 0.0044 |
| D | 0.021 | 0.35 | 0.330* | 0.001 | <0.001 | 29.75 | 59.63 | 0.26 | 0.25 | 0.16 | 0.0044 |

*indicates that conditions do not satisfy those defined by the present invention.

After being cut to a necessary length, the plate material was heat-treated (annealed) in the atmosphere in which a minute amount of water vapor is contained in hydrogen. The heating temperature was changed in the range of 600 to 1250° C., the heating time was changed in the range of 0.5 to 60 minutes, and the water vapor concentration was changed in the range of 17 to 6000 ppm. Further, some specimens were subjected to TT treatment at 725° C. (10 hours). The treatment conditions are given in Table 2. Concerning the film thickness, measurement was made in five optional locations of a SEM image (magnification: ×100,000), and the mean value of five measured values was made a film thickness.

elution test was conducted in an autoclave. The simulating solution was distilled water containing 500 ppm of B and 2 ppm of Li. After degassing had been performed sufficiently, a gaseous mixture of hydrogen and argon was pressurized, whereby the solution was made such as to correspond to dissolved hydrogen 30 cc-STP/kgH$_2$O. The test temperature was set at 325° C., and the test time was set at 500 hours. Immediately after the test had been finished, the solution was analyzed by using an inductively coupled plasma mass spectrometer (ICP-MS), and the amount of released Ni ion per unit surface area (g/m$^2$) of the test specimen was examined. The examination result is also given in Table 2.

It can be seen that although, in test Nos. 1 to 3, the film was formed so that the average film thickness was about 50 nm, in test Nos. 1 and 2 in which the content of Mn in the base metal was within the range defined in the present invention, the amount of released Ni was small as compared with test No. 3. There could be seen a tendency for the amount of released Ni to become smaller with the decrease in the content of Mn in the base metal. Also, in test No. 4, although TT treatment for improving the stress corrosion cracking resistance was performed, concerning the Ni eluting property, an influence was scarcely seen.

TABLE 2

| Test No. | Alloy | Water vapor concentration (ppm) | Heating temperature (° C.) | Heating time (min) | Thermal Treatment (TT) | Film thickness (nm) | Ni released amount (g/m$^2$) | Mn/Cr | |
|---|---|---|---|---|---|---|---|---|---|
| 1 | A | 1000 | 725 | 60 | Not | 48 | 0.0003 | 0.0074 | Inventive ex. |
| 2 | B | 1000 | 725 | 60 | Not | 54 | 0.0021 | 0.0132 | Inventive ex. |
| 3 | C* | 1000 | 725 | 60 | Not | 56 | 0.0066 | 0.0265 | Comparative ex. |
| 4 | A | 1000 | 725 | 60 | Performed | 70 | 0.0004 | 0.0125 | Inventive ex. |
| 5 | A | 17 | 600 | 5 | Performed | 5 | 0.0060 | 0.0203 | Inventive ex. |
| 6 | A | 1000 | 700 | 20 | Performed | 35 | 0.0005 | 0.0073 | Inventive ex. |
| 7 | A | 1000 | 900 | 20 | Performed | 170 | 0.0019 | 0.0103 | Inventive ex. |
| 8 | A | 500 | 1100 | 10 | Performed | 178 | 0.0035 | 0.0145 | Inventive ex. |
| 9 | A | 1000 | 1100 | 5 | Not | 454 | 0.0056 | 0.0055 | Inventive ex. |
| 10 | A | 1000 | 1100 | 5 | Performed | 465 | 0.0045 | 0.0090 | Inventive ex. |
| 11 | B | 1000 | 1100 | 5 | Performed | 480 | 0.0055 | 0.0240 | Inventive ex. |
| 12 | D* | 1000 | 1100 | 5 | Not | 477 | 0.0102 | 0.1080 | Comparative ex. |
| 13 | B | 3000 | 1200 | 20 | Performed | 1450 | 0.0050 | 0.0680 | Inventive ex. |
| 14 | A | 0 | 1100 | 2 | Not | 4* | 0.06 | 0.012 | Comparative ex. |

*indicates that conditions do not satisfy those defined by the present invention.

The outer surface of the specimen obtained as described above was washed with an alkali degreasing liquid and rinse water, and further washed with acetone. The washed specimen was used as a test specimen.

(2) Evaluation of Ni Eluting Property

The Ni eluting property of test material was evaluated as described below. The test specimen was put into a pure titanium tube. After being filled with a certain amount of solution simulating a nuclear reactor primary system, the tube was sealed by using a titanium-made lock, and an In test Nos. 5 to 14, the film thickness was regulated by changing the heating conditions, and the influence on the Ni eluting property was examined. In test Nos. 9 to 12, the film was formed so that the average film thickness was about 500 nm. For the film thickness of this degree as well, in test Nos. 9 to 11 in which the content of Mn in the base metal was within the range defined in the present invention, the amount of released Ni was small as compared with test No. 12.

Also, comparing test Nos. 1, 4, and 6 to 10 in which the same alloy A was used, in the range of film thickness of smaller than 180 nm, there was recognized a tendency for the amount of released Ni to become smaller with the decrease in film thickness. In particular, in the case where the film thickness was 170 nm or smaller, this tendency was remarkable. Even if the film thickness was 50 nm or smaller, which thickness had a low possibility of occurrence of film cracking, peeling, and the like, and was desirable as a product, the elution preventing effect was maintained. The alloy having such a thin film can be produced with relative ease by making the water vapor concentration of heating condition 1000 ppm or lower.

Concerning the Mn/Cr ratio in the oxide film given in Table 2, the concentration at each depth was measured in the range to a depth from the film surface of 50 nm by GDS analysis, the value was integrated, and the Mn/Cr ratio was calculated as an atom ratio. In the case where the film thickness was smaller than 50 nm, the Mn/Cr ratio was likewise calculated in the range of the entire thickness.

From Table 2, it can be seen that even if the film thickness is of the same degree, a high elution preventing effect can be achieved by keeping the Mn/Cr ratio low. By making the content of Mn in the base metal less than 0.1%, and by regulating the heating conditions, the Mn/Cr ratio in the oxide film can be made 0.00001 or higher and lower than 0.05. Thereby, the Cr-containing austenitic alloy according to the present invention, which is excellent in Ni elution resistance, can be produced.

INDUSTRIAL APPLICABILITY

According to the present invention, by suppressing the content of Mn in the base metal, the amount of Mn that is present in the chromium oxide film can be decreased when heating is performed, whereby a Cr-containing austenitic alloy excellent in metal elution resistance can be obtained. Furthermore, by regulating the heating conditions and by keeping the Mn/Cr ratio in the film in a predetermined range, the effect can be achieved reliably. Even if the Cr-containing austenitic alloy is used in a high-temperature water environment that is harsh to metal materials, for example, in a high-temperature water environment of a nuclear power plant for a long period of time, the elution of Ni is very little. Therefore, the Cr-containing austenitic alloy according to the present invention is suitable as a member used in high-temperature water, such as a steam generator tubing, especially as a member for a nuclear plant.

What is claimed is:

1. A Cr-containing austenitic alloy having a base metal and a chromium oxide film consisting essentially of $Cr_2O_3$, $MnCr_2O_4$, $TiO_2$, $Al_2O_3$ and $SiO_2$ with a thickness of 5 nm or larger, wherein the chemical composition of the base metal consists of, by mass percent, C: 0.15% or less, Si: 1.00% or less, Mn: less than 0.1%, P: 0.030% or less, S: 0.030% or less, Cr: 10.0 to 40.0%, Ni: 55 to 80.0%, Ti: 0.5% or less, Cu: 0.6% or less, Al: 0.5% or less, and N: 0.20% or less, the balance being Fe and impurities, and wherein the chromium oxide film is formed directly on a surface of the base metal or directly on another oxide layer formed directly on a surface of the base metal.

2. The Cr-containing austenitic alloy according to claim 1, wherein the thickness of the chromium oxide film is smaller than 180 nm.

3. The Cr-containing austenitic alloy according to claim 2, wherein the Mn/Cr ratio in a surface layer of the chromium oxide film is, by atom ratio, 0.00001 or higher and lower than 0.05.

4. The Cr-containing austenitic alloy according to claim 3, wherein the Cr-containing austenitic alloy is used as a member for a nuclear plant.

5. The Cr-containing austenitic alloy according to claim 2, wherein the Cr-containing austenitic alloy is used as a member for a nuclear plant.

6. The Cr-containing austenitic alloy according to claim 1, wherein the Mn/Cr ratio in a surface layer of the chromium oxide film is, by atom ratio, 0.00001 or higher and lower than 0.05.

7. The Cr-containing austenitic alloy according to claim 6, wherein the Cr-containing austenitic alloy is used as a member for a nuclear plant.

8. The Cr-containing austenitic alloy according to claim 1, wherein the Cr-containing austenitic alloy is used as a member for a nuclear plant.

9. A method for producing the Cr-containing austenitic alloy according to claim 1, wherein the surface of the Cr-containing austenitic alloy, in which the content of Mn in the base metal is, by mass percent, less than 0.1%, is heated to the temperature range of 600 to 1200° C. in a gaseous mixture atmosphere in which water vapor is contained in a non-oxidizing gas, and thereby a chromium oxide film is formed on the surface of the Cr-containing austenitic alloy.

10. The method for producing a Cr-containing austenitic alloy according to claim 9, wherein the water vapor concentration is 1000 ppm or less.

* * * * *